March 15, 1949.  H. F. HEAVENER  2,464,392
SAFETY HITCH FOR TRAILERS AND THE LIKE
Filed June 2, 1947
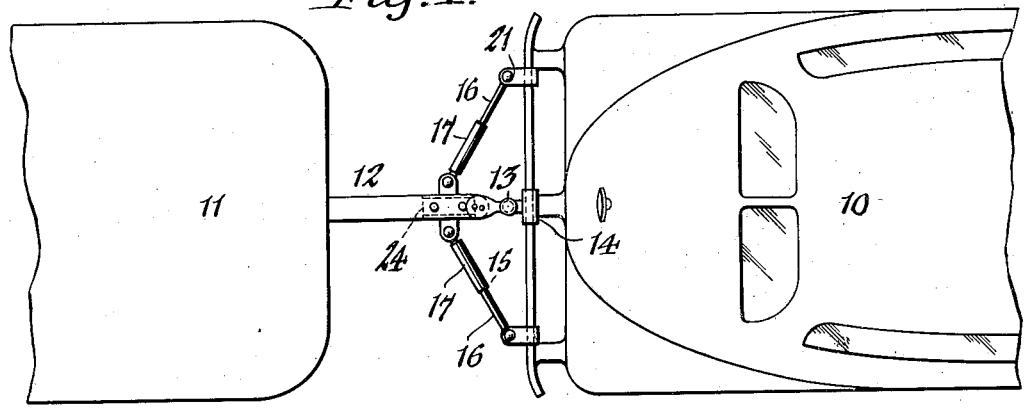
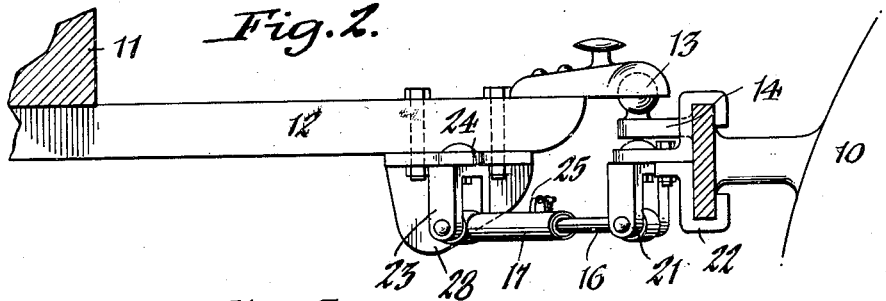
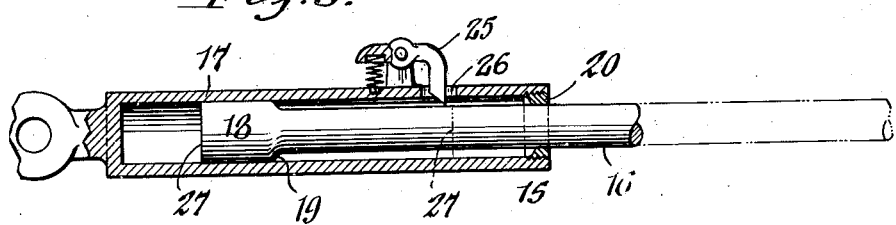
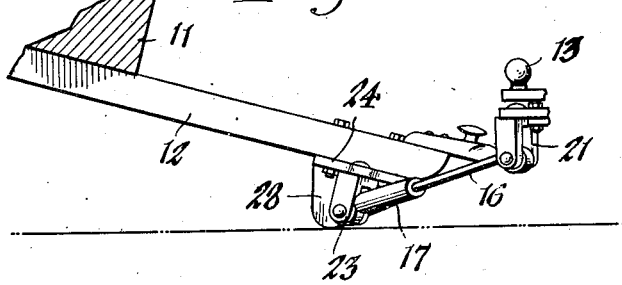
INVENTOR,
Howard F. Heavener,
BY Walter P. Geyer
ATTORNEY.

Patented Mar. 15, 1949

2,464,392

UNITED STATES PATENT OFFICE 2,464,392

SAFETY HITCH FOR TRAILERS AND THE LIKE

Howard F. Heavener, Williamsville, N. Y.

Application June 2, 1947, Serial No. 751,922

5 Claims. (Cl. 280—33.44)

This invention relates generally to vehicle and trailer connections but more particularly to a safety hitch for trailers.

One of its objects is to provide a hitch or connection of this character which is so designed as not to interfere with the usual or normal coupling between the vehicle and the trailer, but which will effectually and positively insure a safety connection between the vehicles should the usual coupling become disconnected for any reason.

Another object of the invention is to provide a safety hitch for trailers, which, while flexible to respond to the varied angular relations assumed by the vehicles during travel, affords a true guiding connection between them in case of the normal coupling becoming accidentally disconnected, and it further prevents the trailer getting out of control and causing accidents.

Other features of the invention reside in the construction and arrangement of parts hereinafter described and particularly pointed out in the appended claims.

In the accompanying drawings:

Figure 1 is a top plan view of my safety hitch in its normal assembled relation between a vehicle and a trailer. Figure 2 is an enlarged side view thereof. Figure 3 is an enlarged fragmentary sectional elevation of one of the telescopic connections of the hitch. Figure 4 is a side elevation showing the position assumed by the safety hitch should the usual coupling become accidently disconnected.

Similar characters of reference indicate corresponding parts throughout the several views.

By way of example, I have shown my safety hitch in operative relation to a motor vehicle 10 and a trailer 11 having a pivoted connecting tongue 12 universally joined or coupled by the customary ball fitting 13 applied to a bracket 14 mounted on the rear end of the vehicle.

In its preferred construction, the safety hitch, which is auxiliary to the normal coupling between the vehicles, comprises flexible telescopic connections indicated generally by the numeral 15 which are disposed in angular or rearwardly-converging fashion, as shown in Figure 1, between the tongue 12 and the vehicle 10 and which are adapted to expand and contract in response to the varied angular relations assumed by the vehicles under normal driving conditions. Each telescopic connection consists of the relatively longitudinally movable members 16 and 17, the former being in the form of a rod or plunger having a head 18 at its inner end defining an outwardly-facing shoulder 19 and the companion member 17 being in the form of a tube having a stop collar or shoulder 20 at its open outer end against which the rod-head 18 is adapted to abut to limit the expanding movements of the telescoping members. The inner telescoping rod member 16 is pivotally connected to a universal fitting 21 mounted on a suitable bracket 22 applied to the rear end of the vehicle 10, while the outer telescoping tubular member 17 is similarly connected to a universal fitting 23 mounted on a suitable bracket 24 applied to the tongue 12 adjacent the front end thereof, whereby the telescopic connections are free to swivel or pivot both vertically and horizontally. In addition to limiting the expanding movements of the telescoping connections as just described during a normal angular displacements of the vehicle and the trailer, I also provide means for preventing contraction of the connection after its extension, as when the hitch is called into operation by reason of the coupling tongue becoming accidently disconnected. For this purpose the tubular member 17 is provided adjacent its free end with a spring-urged dog or detent 25 extending through an opening 26 in such member for latching behind the end face 27 of the rod-head 18 and preventing contraction of the telescoping members under conditions which have extended them to their maximum.

Should the pivoted tongue 12 become accidently uncoupled from the vehicle while travelling along the road, the parts assume the position shown in Figure 4. To prevent the free end of the tongue digging into the road and causing further damage, I provide the tongue-bearing bracket 24 with a shoe or runner-like member 28 which serves to support the uncoupled tongue in the manner shown in Figure 4.

While manifestly simple, compact, and inexpensive in construction, this safety hitch assures a positive guiding and towing connection between the vehicle and the trailer in the event that the usual coupling is accidently disconnected while travelling along the highway, and it effectually prevents accidents under such conditions.

I claim as my invention:

1. A safety hitch auxiliary to the usual coupling tongue employed between a vehicle and a trailer, comprising telescoping rearwardly-converging connections universally joined at their outer divergent ends to opposite sides of the rear end of the vehicle and at their opposite converging ends to the coupling tongue, and complementary means applied to said connections for limiting their expanding movements and for preventing their contraction after having been expanded to their limit, respectively.

2. In combination with a motor vehicle and a trailer including a draft tongue connecting such vehicles, of an auxiliary safety hitch comprising rearwardly-converging, expansible connections radiating from opposite sides of said tongue and pivoted at their rear ends thereto and at their front ends to the rear end of the motor vehicle, and opposing stop elements applied to each of said connections for limiting their expanding movements.

3. A safety hitch auxiliary to the usual coupling tongue employed between a vehicle and a trailer, comprising a bracket adapted for attachment to the tongue and having a runner-like member depending therefrom for engagement with the roadway should said tongue be accidently disconnected from the vehicle, and telescopic connections diverging forwardly from said tongue and universally pivoted at their ends to said bracket and at their front ends to the rear end of the motor vehicle.

4. In combination with a motor vehicle and a trailer including a draft tongue connecting such vehicles, of an auxiliary safety hitch comprising rearwardly-converging, expansible connections radiating from opposite sides of said tongue and pivoted at their rear ends thereto and at their front ends to the rear end of the motor vehicle, opposing stop elements applied to each of said connections for limiting their expanding movements, and releasable stop means for preventing contraction of said elements after having been expanded to their limit.

5. In combination with a motor vehicle and a trailer including a draft tongue connecting such vehicles, of an auxiliary safety hitch comprising rearwardly-converging, expansible connections radiating from opposite sides of said tongue and pivoted at their rear ends thereto and at their front ends to the rear end of the motor vehicle, one of said connections being in the form of a tube having a stop shoulder at its outer end and the other being in the form of a rod having a head at its outer end adapted to abut said shoulder for limiting the expanding movements of said connections, and a releasable spring-urged dog applied to tubular connection for latching behind the end face of the rod-head in the extended position of the connections to prevent their contraction under such conditions.

HOWARD F. HEAVENER.

REFERENCES CITED

The following references are of record in the file of this patent:

UNITED STATES PATENTS

| Number | Name | Date |
|---|---|---|
| 1,923,904 | Allen et al. | Aug. 22, 1933 |
| 2,053,255 | Ferguson et al. | Sept. 8, 1936 |
| 2,085,260 | Keys | June 29, 1937 |
| 2,196,115 | Jocobson | Apr. 2, 1940 |
| 2,251,656 | Botelho | Aug. 5, 1941 |